US012267420B2

(12) United States Patent
Lee

(10) Patent No.: US 12,267,420 B2
(45) Date of Patent: Apr. 1, 2025

(54) SYSTEMS AND METHODS FOR PROGRAMMABLE CORPORATE POLICIES AND MANAGEMENT INTERVENTION

(71) Applicant: Yuen Ping Lee, Tai Po (HK)

(72) Inventor: Yuen Ping Lee, Hong Kong (HK)

( * ) Notice: Subject to any disclaimer, the term of this patent is extended or adjusted under 35 U.S.C. 154(b) by 192 days.

(21) Appl. No.: 18/078,119

(22) Filed: Dec. 9, 2022

(65) Prior Publication Data

US 2024/0195610 A1    Jun. 13, 2024

(51) Int. Cl.
   *G06F 21/60*     (2013.01)
   *G06F 16/2455*   (2019.01)
   *G06F 21/62*     (2013.01)
   *G06Q 10/10*     (2023.01)
   *H04L 9/08*      (2006.01)

(52) U.S. Cl.
   CPC ............ *H04L 9/085* (2013.01); *G06F 21/602* (2013.01); *G06F 21/6227* (2013.01)

(58) Field of Classification Search
   CPC ..... H04L 9/085; G06F 21/602; G06F 21/6227
   USPC ....................................................... 380/44
   See application file for complete search history.

(56) References Cited

U.S. PATENT DOCUMENTS

| | | | | |
|---|---|---|---|---|
| 6,859,455 B1* | 2/2005 | Yazdani | ............ | G06F 16/90344 707/E17.042 |
| 2007/0087756 A1* | 4/2007 | Hoffberg | .......... | G06Q 10/06375 455/450 |
| 2007/0143827 A1* | 6/2007 | Nicodemus | ........... | H04L 63/102 726/2 |
| 2007/0143851 A1* | 6/2007 | Nicodemus | ......... | H04L 63/1433 726/4 |
| 2008/0059414 A1* | 3/2008 | Cristofor | ................. | G06F 16/22 |
| 2009/0254572 A1* | 10/2009 | Redlich | .................. | G06Q 10/10 |
| 2015/0310188 A1* | 10/2015 | Ford | ..................... | H04L 63/101 726/28 |
| 2016/0217381 A1* | 7/2016 | Bloomquist | ........... | G06N 5/046 |
| 2016/0232362 A1* | 8/2016 | Conway | ................ | G06F 21/602 |
| 2016/0337441 A1* | 11/2016 | Bloomquist | ........... | G06Q 10/06 |
| 2018/0343238 A1* | 11/2018 | Tola | ..................... | H04L 63/0421 |
| 2020/0134199 A1* | 4/2020 | Conway | ................ | G06F 21/602 |
| 2021/0150035 A1* | 5/2021 | Geysermans | ......... | G06F 21/602 |

(Continued)

OTHER PUBLICATIONS

Bruno Astuto A; A Survey of Software-Defined Networking: Past, Present, and Future of Programmable Networks; IEEE: Year:2007; pp. 1617-1634.*

*Primary Examiner* — Monjur Rahim
(74) *Attorney, Agent, or Firm* — W&P International (Asia) Ltd.

(57) ABSTRACT

Encrypted export controlled items within a corporate asset infrastructure may be searched for vendor access. Different versions of an export policy may change the ways in which the search is performed based on calculation of a numerical representation of a classification to identify the best forwarding location for a vendor access that is not subject to a Restricted Destination List. An indexing value may be determined, transparently with respect to a vendor, based on a desired plaintext item of data and a redacted technical data list. The indexing value may be used to access an entry in an indexing structure to obtain a corresponding document-oriented record which includes an encrypted ciphertext item. Positions of items of the indexing structure may be based on corresponding plaintext items.

16 Claims, 6 Drawing Sheets

(56) References Cited

U.S. PATENT DOCUMENTS

2021/0334873 A1* 10/2021 Wong ..................... G06F 16/951
2021/0399911 A1* 12/2021 Jorasch ............... H04L 12/1822
2021/0400142 A1* 12/2021 Jorasch ............... H04L 65/1069

* cited by examiner

SYSTEMS AND METHODS FOR PROGRAMMABLE CORPORATE POLICIES AND MANAGEMENT INTERVENTION

FIELD OF THE INVENTION

The present application relates generally to computers, and computer applications, and more particularly to corporate information management.

BACKGROUND OF THE INVENTION

Companies use document-oriented recordset storage systems to store and search data used in various aspects of their businesses. The data may include as many as several million records, at least some of which the companies wish to keep private information. Such information may be of value to others who may have a malicious intent. If a company's adversary was able to obtain such private information, the adversary could create problems for the company, its customers, or both.

One common method used to protect valuable information in a database and to comply with export control regulations or policies is encryption. However, use of encrypted data in a database raises other issues, such as, for example, how to permit authorized access to the data by existing applications and how to find particular items of the data without decrypting all of the data and performing a linear search.

Although exports are commonly associated with international shipments, an export can occur even where there is no cross-border activity. "Export" means any transfer of Controlled Items (including information) by physical, electronic, oral, or visual means to a person from another country. It does not matter if you are working inside or outside the country where a person is based: if you share Controlled Items with a person from another country, you may be exporting. Exporting includes a broad range of activities such as engaging an outside vendor or contractor, sharing a sample document with the vendor, granting the vendor access to a blueprint or manual on electronic databases, or traveling to the vendor's location in another country to talk about project stats. Export Laws may restrict these activities depending on what is being Exported, what the item will be used for, what country it is going to, and who will receive it. The development team will need to complete an export review that entails having an export team to look at the list of items the development team intends to share, and determine any license requirements for the recipient countries. After review, the export team will provide an export control classification number for each item, and describe any applicable restrictions.

Sharing technologies with colleagues could be an export. The law treats sharing technologies with a foreign alien person the same as if sending the code off to that person's country, even if that person is an employee or contractor literally working at the same office in the base country. HR will work with legal staff during the onboarding process to define the nature of hiring of technical roles and determine if any export restrictions apply to the candidate. The review and approval process for the SOW is determined based on 1) technical work involved, 2) if any of the work is being done outside of the base country, and 3) even if the work is done within the base country, will it be sharing technology with any foreign alien persons. Disclosure is required if any work will be done in a different country from where the development team is based. Export approval is needed before sharing any technology. The vendor will be required to disclose any foreign locations and nationalities working on the project, and submit it for export review before the SOW is finalized. Any change of work locations or nationality disclosed in the SOW must be submitted to export review. Renewals or amendments must be submitted to the export review.

The legal landscape of cryptography is complex and constantly changing. The operation of a computer network produces vast quantities of controlled items that need to be stored. To provide the data storage, the communications network includes a corporate asset infrastructure that includes a wide array of storage equipment and software. Typically, in a large computer network, this type of complex corporate asset infrastructure is difficult and expensive to manage. The result of this complex corporate asset infrastructure is often wasted expense and inefficiency. The management of the corporate asset infrastructure in a computer network has not developed any systematic approach that goes beyond reducing legal liability and avoiding serious sanctions. Improved tools for managing export-controlled corporate asset infrastructures are needed that can uncover better data for better decisions while quickly and effectively addressing compliance concerns.

SUMMARY OF THE INVENTION

Examples of the invention include export-controlled corporate asset infrastructures and methods for a computer network that produces a plurality of vendor access to network controlled items. The exported-controlled corporate asset infrastructure comprises a plurality of controlled item storage systems and an export review management system. The controlled item storage systems are configured to store the network controlled items and comprise redaction systems.

It should be appreciated that the export review management system provides a tool for assisting the export team in uncovering better forwarding locations and assigning vendor access to zones. Advantageously, the export review management system requires the export team to consider a rigorous set of factors and variables in a consistent and disciplined manner for each vendor access. The result is a high-quality and consistent approach to the assignment of vendor access to zones, thereby quickly and effectively addressing compliance concerns.

An export policy is a set of verifiable guidelines and instructions related to providing an export control classification number for complying with the requirements for each item. For a given vendor access, a programmable export policy may include a red flag function written in a machine language, such as javascript, that a processing device can understand and execute to add a red flag indicator to an indexing value of an item, puts a controlled item search on pause, and resumes vendor access to a controlled item depending on reexamination results by the export team. For a given vendor access, a programmable export policy may include an classification function that adds together the scores for all of the vendor access factors to calculate a numerical representation for the vendor access. A programmable export policy may include a jump function for suggesting a forwarding location that is not a subject of restrictions found on Restricted Destinations List, and subsequently change a controlled item's location to a different zone. Advantageously, a programmable export policy may use a forwarding location to authorize a combination of transfer from a controlled item's current location to the forwarding location and transfer to a recipient vendor location from the forwarding location without being subject to any export restrictions.

In one embodiment, a search for a data item corresponding to an encrypted ciphertext item of an encrypted attribute of a record included in a recordset may be performed by using an indexing structure corresponding to the encrypted attribute of the records. A code may be calculated, transparently with respect to a requester, based on the data item and a transformation expression. The code may be used as an index to the indexing structure, which may have entries organized according to respective codes based on corresponding data items and the transformation expression. In some implementations, each of the entries of the indexing structure may include the respective code and data for accessing a record that includes a corresponding encrypted ciphertext item of the encrypted attribute of the records.

Export review management system selects the class of export for the vendor access based on the key variables and the classification. For example, once the variables are selected for the vendor access, the export review management system compares the vendor access variables against the class-of-export variables to determine which classes-of-export are suitable for the vendor access. The classification is used to select from among the suitable classes of export. For example, both the extremely critical and mission critical classes-of-export may be suitable for a given vendor access. The extremely critical class-of-export may be used if the vendor access has a classification numerical representation higher than 10 and the mission critical class-of-export may be used if the vendor access has a classification numerical representation of 10 or lower.

DETAILED DESCRIPTION OF THE INVENTION

Export-Controlled Items Storage

Figure 1A:
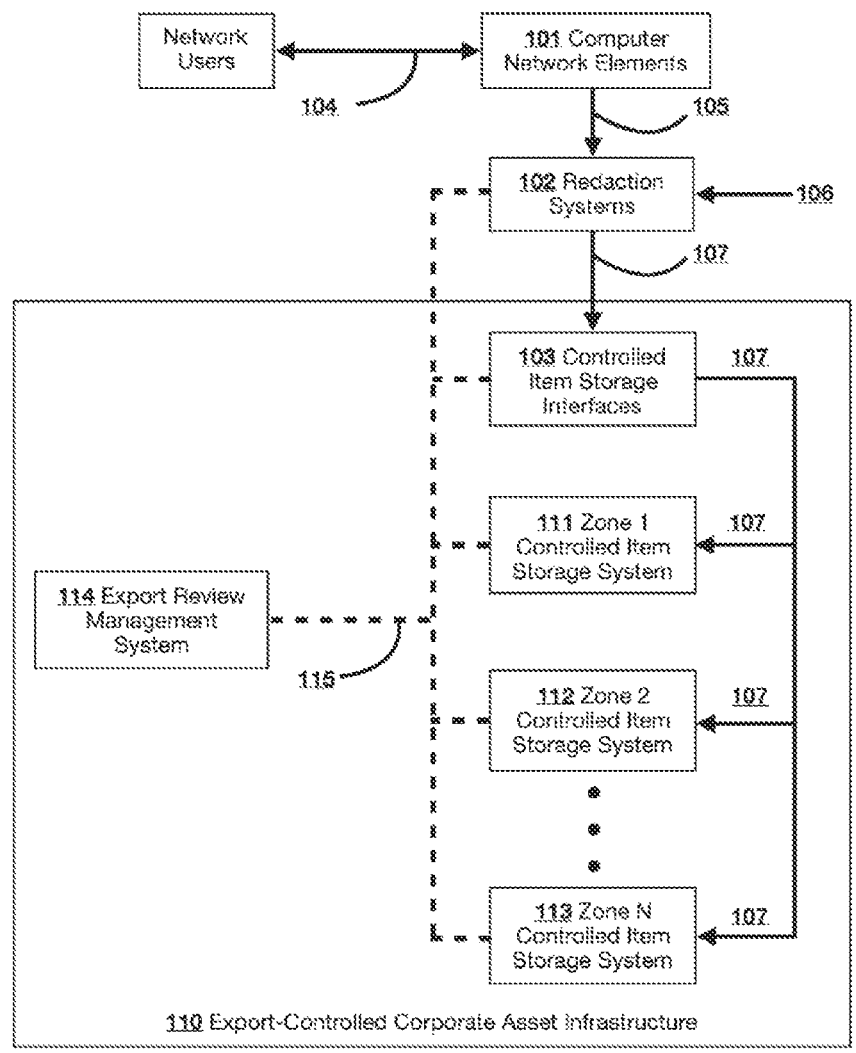
FIG. 1A illustrates a computer system having an export-controlled corporate asset infrastructure in an example of the invention.

Examples of the invention include export-controlled corporate asset infrastructures and methods for a computer network that produces a plurality of vendor access to network controlled items. The exported-controlled corporate asset infrastructure comprises a plurality of controlled item storage systems and an export review management system. The controlled item storage systems are configured to store the network controlled items and comprise redaction systems.

In certain embodiments, the export-controlled corporate asset infrastructure further comprises a secure encrypted backup system and method for encrypting and encoding a passphrase-protected private key record in the form of an encoded printable string. Encrypted private key records are intended for use on paper wallets. Each record string contains all the information needed to reconstitute the private key except for a passphrase. A secret is secured in a distributed way, most often to secure other encryption keys. The secret is split into multiple parts, called shares, which individually should not give any information about the secret. A minimum number of shares are needed in order to unlock the secret. This is called the threshold, and is used to denote the minimum number of shares needed to unlock the secret. Any number of shares less than the threshold will not have any additional information about the secured secret.

In certain embodiments, an owner shares a passcode by generating a certain number of shares, where a certain number of shares can be allocated to each associate. The associates can only reconstruct the secret if they combine more shares than the threshold. The threshold can be appropriately set for the number of associates, so the secret is always accessible by the authorized individuals. If a small number of shares were compromised, these shares could not be used to find the passcode unless other associates cooperate. In a shared private key generation scheme where the party generating the final key string and its associated address knows only a string derived from the original passphrase, and where the original passphrase is needed in order to actually recompute the associated address.

A hash of the resulting address is encoded in plaintext within each encrypted key, so it can be correlated to an address with reasonable probability by someone not knowing the passphrase. The complete address can be derived through successful decryption of the key record. The user may choose a passphrase of their choice whose minimum length and required format does not preclude the user from memorizing it or engraving it on a physical medium. The passphrase may be much shorter than the length of a typical private key, short enough that a label or engraver can be used to permanently commit a passphrase to a physical piece. The user also has the ability to generate a large number of addresses protected by the same password, while enjoying a high degree of security.

Password and passphrase-protected private keys enable sending private access from person to person. Someone wanting to send private access through postal mail could send a password-protected paper wallet and give the recipient the passphrase over the phone or e-mail, making the transfer safe from interception of either channel. A user of paper wallets or vouchers could carny encrypted private keys while leaving a copy at home as an element of protection against accidental loss or theft. A user of paper wallets could keep the password in a bank vault or safety deposit box, and at the same time share the password with trusted associates as protection against someone gaining access to the paper wallets.

In certain embodiments, the method supports encrypting a private key by offering the ability for encrypting any known private key, wherein the party performing the encryption must know the passphrase. In another embodiment, the method supports encrypting a private key by offering the ability for someone to generate encrypted keys knowing only an intermediate code derived from the original passphrase and without knowing the passphrase itself. Only the person who knows the original passphrase can decrypt the private key. The intermediate code conveys the information needed to generate such a key without knowledge of the passphrase.

In certain embodiments, the person who knows the passphrase and who is the intended beneficiary of the private keys is the owner, who will generate one or more intermediate codes to give to one or more associates. An associate may generate a key pair with an intermediate code. The associate can know the address and encrypted private key, but cannot decrypt the private key without the original passphrase. In another embodiment, the owner may generate an address and an encrypted private key himself, and in turn give the address and encrypted private key to the associates. The system advises an owner who has requested multiple private keys to be generated to ensure that each private key has a sequence number consistent with the generateds intermediate codes. The party generating the address has the option to return a confirmation code which allows the owner to independently verify that a given address actually depends on the passphrase. This protects the owner from being given an address by the second party that is unrelated to the key derivation and possibly spendable by the second party. If an address given to the owner can be successfully regenerated through the confirmation process, the owner can be reasonably assured that any spending without the passphrase is infeasible.

In certain embodiments, given a passphrase and given a confirmation code, the method can recalculate the address, verify the address hash, and then assert that the address actually depends on this passphrase. If shards of a secret key have been distributed to an owner's associates, the associates will be able to recover any encrypted data in case the owner lose it or become incapacitated. In one embodiment, a user can specify a threshold for recovery that is lower than the total number of shards. This approach protects against some members of the associates losing their shards.

In certain embodiments, the owner may distribute shards to associates on physical media. The owner may notify the associates who else is on their team, The owner may distribute a secret amongst a group of participants, each of which is allocated a share of the secret. The secret can only be reconstructed when the shares are combined together. The owner gives each associate a share in such a way that any group of t (for threshold) or more associates can together reconstruct the secret but no group of less than t associates can. An owner could send t shares, all of which are necessary to recover the original secret, to a single recipient, using t different channels. The owner could generate shares for a vault's unlocking code and hand them out to his associates. Even if the owner is not available, the vault can be opened, but only, when a certain number of associates do it together. In some embodiments, larger secrets are encrypted with a block cipher and apply secret sharing to just the key.

In some examples of the invention, the export-controlled corporate asset infrastructure further comprises a plurality of controlled item storage interfaces configured to exchange the network controlled items between the computer network and the controlled item storage systems. To have a realistic chance of identifying and intercepting unlicensed transfers, export teams need to adopt effective mechanisms of risk profiling. Electronic risk profiling alone is not sufficient to identify illegal transfers but must be complemented by human analysis to be effective. There are different indicators that can be taken into account when conducting risk profiling. Indicators could be related to the goods, the recipient vendors, the shipping route or whether a license has previously been denied to a particular vendor. Export teams are well placed to receive and utilize information from a variety of different systems for the purposes of risk profiling, which in turn may require transformation of the information provided by the intelligence services into a redacted form that can be entered into the risk-profiling system for sharing more widely across the export team and the company.

In certain embodiments, redacted technical data may be records that are kept out of the search index in order to keep hidden from vendor's search. In a typical document-oriented recordset storage system, data may be viewed as being stored in recordsets. Work locations and nationalities of a recipient vendor are both factors to consider when the system determines vendor access to the controlled item, together with a controlled item's location, and the sender employee's base country and nationality. Programming export policies determine unauthorized transfers of Controlled Items to persons or entities subject to Export restrictions, and addition of red flag indicators to the controlled items accordingly. The programming export policies may put vendor access to a controlled item on pause, pending for reexamination by an export team via output devices. The programming export policies may provide the export team an option to resume the vendor access by removing the red flag indicator. Further, the programming export policies may include a jump function for suggesting a forwarding location for the vendor access under export review, and an intervention function for redirecting proposed business activities between two sender employees of different nationalities who are based in the same country. Management intervention may be needed for reasons other than export controls, such as proprietary business strategies in anticipation of potential changes in immigration policies that favor employment-based visas by certain nationalities, which are typically limited for use by senior executive-level managers instead of the export team. As such, programming export policy may receive intervention function directly from management, wherein the intervention function may suggest sender employee redirections not to the export team but rather to the management instead. A forwarding location is one where a programming export policy may use to authorize a combination of transfer from an item's current location to the forwarding location and transfer to a recipient vendor location from the forwarding location without being subject to any export restrictions.

An export policy is a set of verifiable guidelines and instructions related to providing an export control classification number for complying with the requirements for each item. In certain embodiments, a semantic versioning scheme is used wherein the version numbers and the way they change convey meaning about the underlying guidelines and instructions and what has been modified from one version to the next. For example, the semantic versioning schema may help to implement and maintain management intervention to direct employees in ways not in contrary to control policy, and to facilitate revisions according to changing control policy that evolves with the times. Moreover, all versions of programmable export policies may have an "effective date" or "last revised date" legend that is easily identifiable, and provide advance notice of upcoming revisions before they become effective. For a given vendor access, a programming export policy may include a red flag function written in a machine language, such as javascript, that a processing device can understand and execute. For example, a programming export policy may include a red flag function that adds a red flag indicator to an indexing value of an item, puts a controlled item search on pause, and resumes vendor access to a controlled item depending on reexamination results by the export team. Different versions of the programming export policy may change the way in which a red flag is processed, and a processing device therefore always verifies the checksum of an export policy file to help ensure the version of the programming export policy and the function contained therein are unaltered, or the function may not run if it cannot be verified by the checksum function. Due to often changing regulations and company policies, an item that has been red flagged by a first version of programming export policy may or may not raise any red flags in subsequent versions of the same export policy. Including red flag indicators with items thereby preserves long term red flag maintenance across changing versions of export policy. An export team may program a later version of programming export policy function for a processing device to search and reexamine red flags indicated by earlier versions of export policy function. Red flag indicators may be used when calculating indexing values in an indexing structure of the recordset system and is described in detail below.

Export Controlled Item Search

FIG. 1A illustrates computer network 100 in an example of the invention. Computer network 100 includes computer network elements 101, redaction systems 102, controlled item storage interfaces 103, controlled item storage systems 111-113, and export review management system 114. Export-controlled corporate asset infrastructure 110 is a part of computer network 100 that comprises controlled item storage interfaces 103, controlled item storage systems 111-113, and export review management system 114. Controlled item storage systems 111-113 are separated into zones 1-N, where system 111 provides zone 1 controlled items, system 112 provides zone 2 controlled items, and system 113 provides zone N controlled items. As indicated on FIG. 1A, there could be many zones.

Computer network elements 101 exchange user communications 104 between vendors to provide communication services. Computer network elements 101 transfer vendor access request 105 to redaction systems 102. Vendor access request 105 includes performance information, user content, and other data that is generated or handled by computer network elements 101. Redaction systems 102 receive vendor access request 105 from computer network elements 101. Redaction systems 102 also receive other data 106 from other network systems and personnel (not shown).

In some examples, export review management system 114 may transfer programming export policies indicating the selected zone for the vendor access to the selected zone of controlled item storage systems 111-113 and to controlled item storage interfaces 103. In response to the programming export policies, controlled item storage interfaces 103 route the vendor access to the selected zone, and the controlled item storage system in the selected zone stores the data and provides the various storage features available at that zone.

It should be appreciated that export review management system 114 provides a tool for assisting the export team in assigning vendor access to zones. Advantageously, export review management system 114 requires the export team to consider a rigorous set of factors and variables in a consistent and disciplined manner for each vendor access. The result is a high-quality and consistent approach to the assignment of vendor access to zones.

Redaction systems 102 process vendor access request 105 and other data 106 to transfer controlled items 107 to controlled item storage interfaces 103. Controlled item storage interfaces 103 could be Storage Area Network (SAN) switches, Network-Attached Storage (NAS) gateways, and other devices that exchange data between redaction systems 102 and controlled item storage systems 111-113. Controlled item storage interfaces 103 transfer controlled items 107 to controlled item storage systems 111-113. Thus, controlled item storage interfaces 103 direct controlled items 107 to the appropriate ones of controlled item storage systems 111-113.

Controlled item storage systems 111-113 receive and store controlled items 107. Controlled item storage systems 111-113 could include disk memory systems, tape memory systems, integrated circuitry memory systems, or some other type of controlled item storage system or media. Note that controlled item storage systems 111-113 are zoned based on performance, where zone 1 has the best performance and zone N has the poorest performance. Typically, zone 1 is the most expensive and zone N is the least expensive. Performance can be measured based on compliance type. For example, zone 1 controlled item storage system 111 may have compliance types required by the Sarbanes-Oxley Act (SOX), and zone N controlled item storage system 113 may have compliance types required by the Service Organization Control (SOC) 2. Other performance measures, such as retrieval speeds or disaster recovery features, could also factor into assigning a zone value to controlled item storage systems 111-113.

Export review management system 114 is coupled to redaction systems 102, controlled item storage interfaces 103, and controlled item storage systems 111-113 by control links 115. Export review management system 114 manages several aspects of export-controlled corporate asset infrastructure 110 and is described in detail below.

Figure 1B:
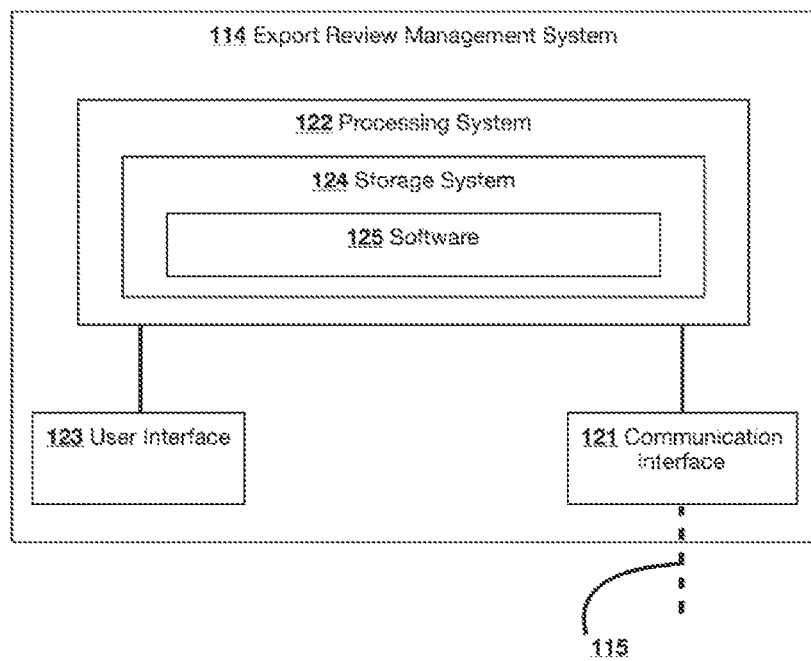
FIG. 1B illustrates an export review management system in an example of the invention.

FIG. 1B illustrates export review management system 114 in an example of the invention. Export review management system 114 includes communication interface 121, processing system 122, and user interface 123. Processing system 122 includes storage system 124. storage system 124 stores software 125. Processing system 122 is linked to communication interface 121 and user interface 123. Export review management system 114 comprises a programmed general-purpose computer, although those skilled in the art will appreciate that programmable or special purpose circuitry and equipment may be used. Export review management system 114 may use a client server architecture where operations are distributed among a server system and client devices that together comprise elements 121-125.

Figure 1C:
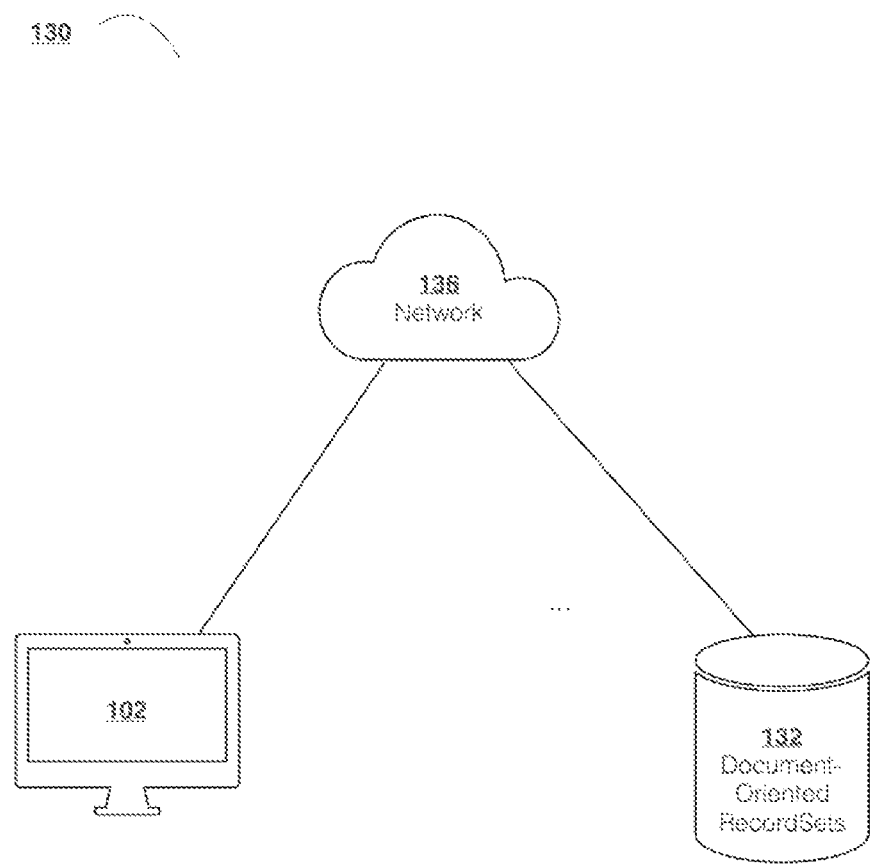
FIG. 1C illustrates an exemplary operating environment consistent with the subject matter of this disclosure.

FIG. 1C illustrates an exemplary operating environment 130 for an embodiment consistent with subject matter of this disclosure. In operating environment 130, redaction system 102 may execute a proposed business activity, which accesses information in a database of controlled item storage system 132 via network 136. The proposed business activity may create, delete, read or modify data in the database of controlled item storage system 132. Controlled item storage system 132 may be, for example, a server or other processing device capable of executing a database system. Redaction system 102 may be a personal computer (PC) or other processing device capable of executing proposed business activities and communicating with controlled item storage system 132 via network 136. Network 136 may be a wired or wireless network and may include a number of devices connected via wired or wireless means. Network 136 may include only one network or a number of different networks, some of which may be networks of different types.

Other operating environments or variations of operating environment 130 may be used with other embodiments consistent with the subject matter of this disclosure. For example, FIG. 1C illustrates controlled item storage system 132 and redaction system 102 as being separate devices. However, controlled item storage systems 132 and redaction system 102 may be combined in a single processing device in one embodiment. In such an embodiment, the operating environment may not include network 136. In another embodiment, functions or services performed by controlled item storage system 132 may be distributed across multiple processing devices which may be connected via a network, such as, for example, network 136.

Figure 1D:
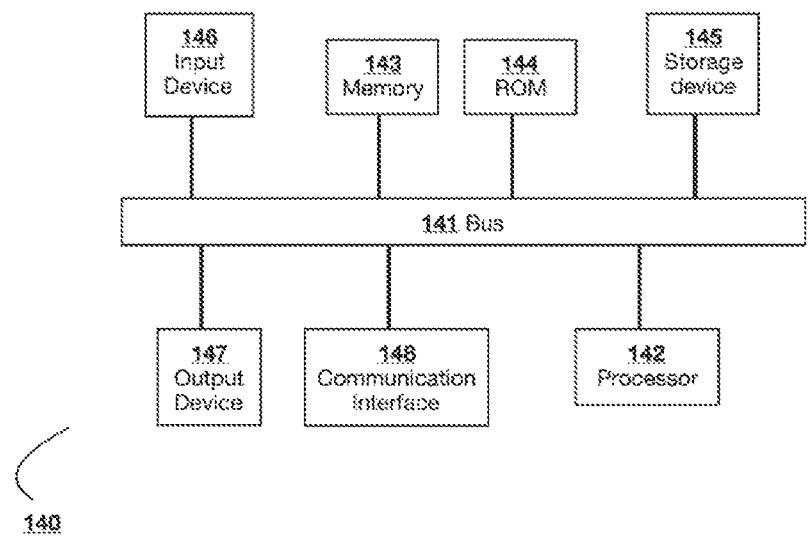
FIG. 1D is a functional block diagram of an exemplary processing device that may be used to implement redaction system 102 of FIG. 1A, controlled item corporate asset system 104 of FIG. 1A, or both.

FIG. 1D is a functional block diagram which illustrates an exemplary processing device 140, which may be used to implement controlled item storage system 132, redaction system 102, or both devices. Processing device 140 may include a bus 141, a processor 142, a memory 143, a read only memory (ROM) 144, a storage device 145, an input device 146, an output device 147, and a communication interface 148. Bus 141 may permit communication among components of processing device 140. In embodiments in which processing device 140 is used to implement both controlled item storage system 132 and redaction system 102 in a single processing device, communication interface 148 may not be included as one of the components of processing device 140.

Processor 142 may include at least one conventional processor or microprocessor that interprets and executes instructions. Memory 143 may be a random access memory (RAM) or another type of dynamic storage device that stores information and instructions for execution by processor 142. Memory 143 may also store temporary variables or other intermediate information used during execution of instructions by processor 142. ROM 144 may include a conventional ROM device or another type of static storage device that stores static information and instructions for processor 142. Storage device 145 may include any type of media for storing data and/or instructions. When processing device 140 is used to implement controlled item storage system 132, storage device 145 may include one or more databases of a database system.

Input device 146 may include one or more conventional mechanisms that permit a user to input information to processing device 140, such as, for example, a keyboard, a mouse, or other input device. Output device 147 may include one or more conventional mechanisms that output information to the user, including a display, a printer, or other output device. Communication interface 148 may include any transceiver-like mechanism that enables processing device 140 to communicate with other devices or networks. In one embodiment, communication interface 148 may include an interface to network 136.

Processing device 140 may perform such functions in response to processor 142 executing sequences of instructions contained in a computer-readable medium, such as, for example, memory 143, or other medium. Such instructions may be read into memory 143 from another computer-readable medium, such as storage device 145, or from a separate device via communication interface 148.

Document-oriented recordset systems typically use some type of indexing scheme for quickly searching data stored in encrypted attributes of records contained in a plurality of recordsets in order to access particular records or objects. One well-known indexing scheme includes use of a B-tree, although other indexing schemes may also be used in other embodiments. In one embodiment, a new data type, which we call a duplet, may be used with the indexing scheme of the document-oriented recordset system. The duplet may include paired data items. For example, the duplet may include a code based on a plaintext item corresponding to an encrypted ciphertext item stored in an encrypted attribute of the records, and a transformation expression, which may be applied to the corresponding plaintext item to obtain a value that is equal to the code included in the duplet. Like the operations depicted above, the duplet may include a code based on a red flag indicator added to an attribute of record by a programming export policy, in which case may put the search on pause pending for reexamination.

In general, in one aspect, the invention relates to a method of processing an export review using a processing device comprising receiving a request to execute a first operation and a version of a programming export policy from a proposed business activity, executing the first operation to obtain initial results, wherein the initial results comprise a plurality of classes-of-export that match a search criteria and a plurality of controlled items associated with the plurality of classes-of-export that match the search criteria, executing the programming export policy to obtain final results, wherein the second operation uses the initial results and an SubjectToRestriction attribute to obtain the final results, wherein the final results comprise a subset of the plurality of controlled items associated with each of the plurality of classes-of-export that match the search criteria, wherein the subset of the plurality of controlled items is determined by applying the programming export policy to the initial results, wherein the programming export policy comprises functionality to query the SubjectOfRestriction attribute for each of the plurality of controlled items to obtain a redacted technical data list wherein each of the plurality of controlled items listed on the redacted technical data list are subject to export restrictions, and discard any of the plurality of controlled items that are in the redacted technical data list to obtain the subset of the plurality of controlled items. An indexing structure of the recordset system may be updated by controlled item storage system 132 by discarding the plurality of controlled items to an index node.

In one implementation, the indexing structure may be a B-tree or other indexing structure, which may be used to search for one or more records in the recordsets having a particular plaintext data item corresponding to encrypted data of an encrypted attribute of the records. Each of the entries of the indexing structure may include an indexing value, corresponding to a code calculated based on the corresponding plaintext data item and the transformation expression, and data for accessing a record of a recordset that includes a corresponding encrypted ciphertext item of the encrypted attribute of the record. In certain embodiments, redacted technical data may be records that are kept out of the search index in order to keep hidden from vendor's search. In one embodiment, a code may be calculated based on a desired plaintext data item and a transformation expression. The code may be used as an index to an indexing structure, which may have entries organized according to respective codes based on corresponding plaintext data items and transformation expressions.

Figure 2:
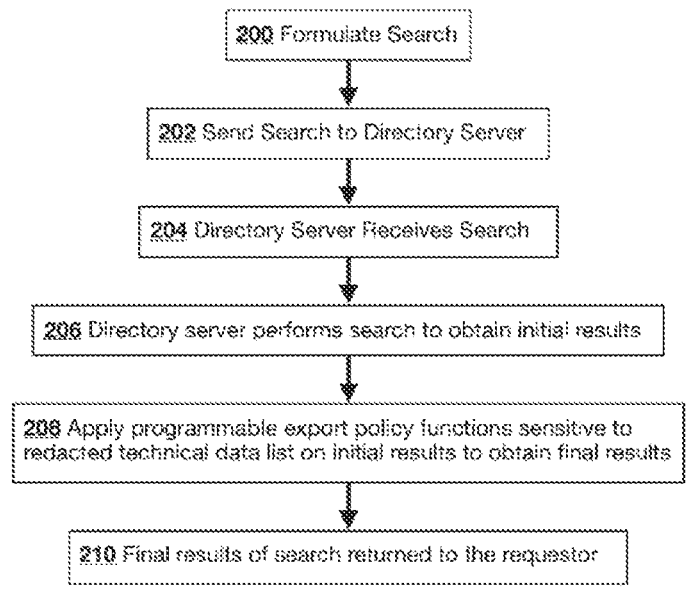
FIG. 2 shows a flowchart in accordance with one embodiment of the invention.

FIG. 2 shows a method in accordance with one embodiment of the invention. Initially, a proposed business activity executing on a processing device formulates a search 200. In one embodiment of the invention, formulating the search includes specifying a search criteria (e.g., criteria used to assess a set of key variables associated with the various classes of export to select one or more classes-of-export in the storage server operatively connected to the processing device). In addition, formulating the search may also include specifying a version of programming export policy which includes functionality to limit the results of the search based on an SubjectToRestriction attribute (described above). A programming export policy is a way to specify extension information. Programming export policies which are sent as part of a request apply only to that request and are not saved. In particular, the programming export policy may be used to define additional operations which are to be performed by the storage server prior to returning results back to the requesting proposed business activity (via the client).

Once the search has been formulated, the search is forwarded to the storage server 202. The storage server receives the search 204. The storage server subsequently performs a search to obtain initial results 206. In one embodiment of the invention, the initial results correspond to the results that match the search criteria as defined during the formulation of the search 200, wherein a set of key variables associated with the various classes of export is assessed to determine the matching. In one embodiment of the invention, the initial results correspond to the entire classes-of-export including, but not limited to, multiple controlled items associated with each of the classes-of-export.

The programming export policy comprises a red flag function (specified during the formulation of the search) which is subsequently applied to the initial results to obtain final results 208. In one embodiment of the invention, applying programming export policies to the initial results includes querying each of the SubjectToRestriction controlled items defined in the storage and determining which controlled items are subject to export restrictions. The result of the aforementioned querying is a redacted technical data list. The controlled items listed in each of the classes-of-export in the initial results are subsequently compared with the list of redacted technical data. Any controlled item in a class-of-export in the initial results that is on the redacted technical data list is removed from the initial search results. Thus, the only controlled items included in the final results are the controlled items in which the proposed business activity has been requested for that are not subject to export restrictions. By removing the controlled items subject to export restrictions, the amount of data transferred between the storage server and the client redaction system is reduced. In addition, the proposed business activity does not need to perform an additional search on the client redaction system to determine which controlled items the proposed business activity is requesting for that are not subject to export restrictions, thereby reducing the computations required on the client redaction system. The final results are subsequently returned to the proposed business activity via the client redaction system 210.

For example, consider a search formulated by proposed business activity 1 which includes search criteria and a version of programming export policy in accordance with one embodiment of the invention. In this particular example, controlled item 1, 2 and 3 are listed on the storage device, wherein only controlled item 1 is subject to export restrictions. Further, class-of-export 1 is associated with controlled items 1 and 2. Similarly, class-of-export 2 is associated with controlled items 1 and 3. Further, class-of-export 3 is associated with controlled item 2. Further, assume that the search criteria resulted in class-of-export 1 and class-of-export 2 satisfying the search criteria. Thus, the initial result would include the portions of the class-of-export 1 and the class-of-export 2 which include multiple controlled items. At this stage, the initial result has not been communicated to proposed business activity 1. The control, specified in the search formulated by proposed business activity 1, subsequently triggers the storage device to query the controlled items (i.e., controlled item 1, controlled item 2, controlled item 3) listed in the storage and determine which controlled items are subject to export restrictions. In this particular example, only controlled item 1 is subject to export restrictions (as indicated by the SubjectToRestriction attribute in the controlled item 1). Thus, controlled item 1 is placed on a redacted technical data list (or alternatively, maintained in memory associated with the storage device while the storage device is applying the programming export policy to the initial result). After applying the programming export policy to the initial result, the controlled items associated with the classes-of-export that are on the redacted technical data list (i.e., controlled item 1 for class-of-export 1 and 2) are removed from the initial result. Thus, the final result includes the classes-of-export (i.e., class-of-export 1, 2 and 3) and only the controlled items (i.e., controlled item 2 for class-of-export 1 and 3, controlled item 3 for class-of-export 2) with which the proposed business activity is requesting for. The final result is communicated to proposed business activity 1 via the client redaction system.

In another embodiment of the invention, the programming export policy may include an explicit list of controlled items which are approved for the proposed business activity. Thus, when a proposed business activity requests one or more controlled items, the request would include search criteria as well as a version of programming export policy which includes the list of controlled items associated with the proposed business activity. The storage device, upon receiving such a request, obtains an initial result using the search criteria and then obtains the final result by comparing the controlled items associated with the classes-of-export in the initial result with the controlled items listed in the control. For each class-of-export, if the controlled item in the class-of-export matches the one or more controlled items associated with the requesting proposed business activity, then the class-of-export is included in the final results. Once all classes-of-export in the initial result have been processed, the final result is forwarded to the requesting proposed business activity (via the client redaction system executing the proposed business activity).

In embodiments consistent with the subject matter of this disclosure, the code based on the plaintext item may be calculated based on a desired plaintext data item and a transformation expression.

In embodiments consistent with the subject matter of this disclosure, an indexing structure may be updated by controlled item storage system 132 by adding an item to an index node or by adding a new index node that includes a new item, such that links corresponding to the new item in the indexing structure. That is, each new item added to a node in the indexing structure, which is not a leaf node, may have a link pointing to an index node including one or more items having a respective indexing value that is less than the indexing value of the added item and a second link pointing to an index node including one or more items having a respective indexing value that is greater than the indexing value of the added item. Further, when a new index node is added to the indexing structure, controlled item storage system 132 may update at least one of the existing links of the indexing structure to point to the new index node. Each new item that controlled item storage system 132 may add to the indexing structure may include a respective index value and either a corresponding expression or a reference to a corresponding expression. When a reference to a corresponding expression is stored in an item of the indexing structure, the corresponding expression may be stored in a separate data structure, such as, for example, a table, an array, or other data structure. If controlled item storage system 132 determines that the found data item is unique in the recordset, then the process is completed. Otherwise, controlled item storage system 132 may search the indexing structure for a next item corresponding to the indexing value.

Vendor Access Assignment to Zones

Figure 3:
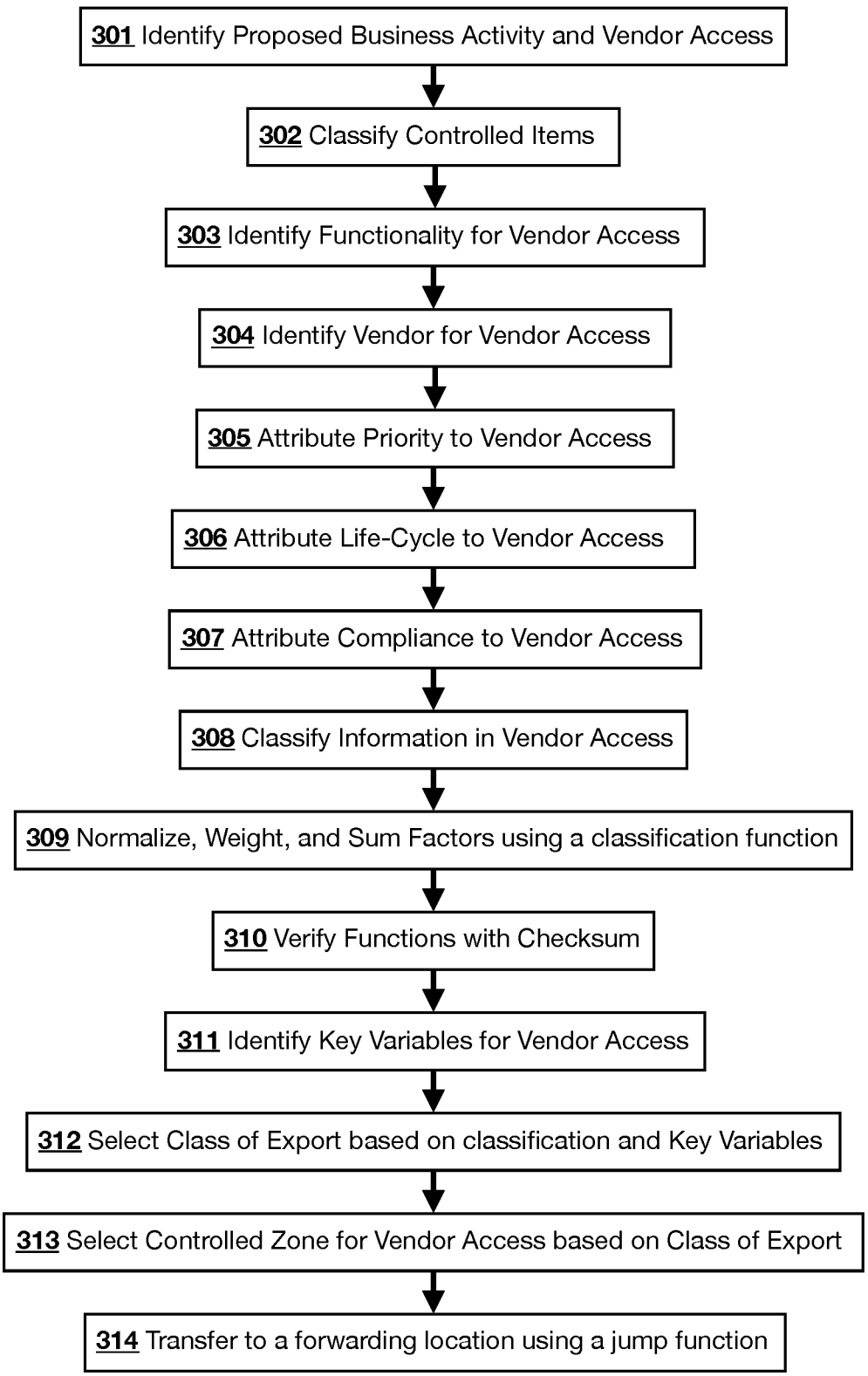
FIG. 3 illustrates a process for assigning vendor access to zones in an example of the invention.

FIG. 3 illustrates the operation of export review management system 114 when assigning vendor access to a zone in an example of the invention. The reference numbers from FIG. 7 are indicated parenthetically below. Typically, the zone assignment is accomplished by an export team interacting with export review management system 114 through its GUI. To determine the zone assignment, the vendor access is first analyzed to determine various factors for the vendor access.

Export review management system 114 starts the process by identifying a proposed business activity and by identifying the vendor access for the proposed business activity 301. Typically, the export team will identify proposed business activities and their vendor access for entry into export review management system 114. A proposed business activity is any functionality in computer network 100 that transfers controlled items 107. The controlled items 107 for the proposed business activity can be separated into identifiable vendor access. A single proposed business activity can have one vendor access or multiple vendor access. For example, the proposed business activity could be a customer support service that has individual vendor access for customer information, and performance information.

Export review management system 114 manages proposed business activity status in some examples of the invention. To accomplish this task, export review management system 114 interacts with an export team through its GUI to provide proposed business activity status and implementation information. Many proposed business activities require Export Review before the activity can take place, and some that generally do not. For example, a list of common activities could be:

Activity #1—Interactions with Vendors, Customers, or other Third Parties.
Activity #2—Technology Development and Publishing.
Activity #3—Hiring.
Activity #4—Physical Exports.
Activity #5—Activities in the Standard Setting or Development Context.

Note that the activities could be further broken down into more specific scenarios. For example, the above list of common activities could be separated as follows:

Activity #1a—Engaging a vendor through a master agreement and/or statement of work ("SOW") for a Technology development project or for technical support.
Activity #1b—For existing agreements, whenever any new hardware, location, or worker nationality is added to an engagement, or the Controlled Item being shared has been significantly revised (e.g., release of a major software build).
Activity #1c—Any other arrangement that involves technical collaboration with a third party.
Activity #1d—Issuing a company-owned laptop to any vendor or contractor for a technical role.
Activity #1e—Allowing an outside visitor to inspect Controlled Items at a company-owner site.
Activity #2a—Allowing external users anywhere to access, download, or view software or Technology residing on company-owned systems.
Activity #2b—Publishing apps or software that are available in other countries, including through third party stores.
Activity #2c—Publishing apps or libraries that include proprietary encryption code or functions.
Activity #2d—Modifying the encryption function of open source software.
Activity #2e—Using software or Technology that qualifies as open source per the company-issued Open Source Software Guidelines.
Activity #3a—Hiring an employee, contractor, or intern for a technical role (e.g., developer, engineer)—see list of Export-Restricted Job Families.
Activity #3b—Sponsoring a candidate for a work visa.
Activity #4a—Shipping Controlled Items across an international border, including shipments of equipment to be repaired or serviced, replacement equipment, and/or test equipment or software—even if the shipment is going to an internal employee or location and the recipient is a national Person.
Activity #4b—Installing Controlled Items on a customer, vendor, or end user's system(s).
Activity #4c—Hand-carrying Controlled Items (including data on laptops or smartphones) across an international border, except for devices for personal or professional use by the traveling employee.
Activity #4d—Contractors traveling internationally with Company-owned devices.
Activity #5a—Participation in standards-setting organizations that involve the exchange of Technology, both formally and informally, through meetings and technical discussions, the draft and review of position papers, creation and review of presentations, and examination of datasets and other materials.
Activity #5b—Presenting topics at conferences that go beyond published material.

Export review management system 114 could retrieve the current status of the various proposed business activities and systems from another system, or the export team could enter the status for each activity and system. Advantageously, export review management system 114 enables the GUI export team to obtain a quick but effective view of the planning and development of export-controlled corporate asset infrastructure 110.

For a given vendor access, export review management system 114 classifies the controlled items for the vendor access 302.

For a classified vendor access, export review management system 114 identifies a functionality for the vendor access 303. The functionality represents the reason for the vendor access. To identify a functionality for the vendor access, the export team is given a choice of functions through some other GUI mechanism. All vendor access are attributed with functionality from a consistent set of functions.

For a given vendor access, export review management system 114 identifies a vendor for the vendor access 304. The vendor represents the entity in computer network 100 that needs the controlled items for the vendor access. To identify a vendor for the vendor access, the export team is given a choice of vendors through some other GUI mechanism. All vendor access are attributed to vendors from a consistent set of vendors.

Export review management system 114 attributes a priority to the vendor access 305. The priority represents the importance of the vendor access to the computer network 100 in terms of access delay, geographically diverse backup, and disaster recovery. To attribute a priority to the vendor access, the export team is given a choice of priority levels for each vendor access through some other GUI mechanism. All vendor access are attributed with a priority from a consistent set of priority levels.

Export review management system 114 attributes a life-cycle to the vendor access 306. The life-cycle represents a time period during which the vendor access retains value to communications network 100. To attribute a life-cycle to the vendor access, the export team is given a choice of time periods for each vendor access through some other GUI mechanism. All vendor access are attributed with a life-cycle from a consistent set of time periods.

Export review management system 114 attributes compliance requirements to the vendor access 307. The compliance requirements indicate if the vendor access needs to be kept for legal purposes. To attribute compliance requirements to the vendor access, the export team is given a choice of compliance types for each vendor access through some other GUI mechanism. All vendor access are attributed to compliance requirements from a consistent set of compliance types.

The vendor access may also be associated with other factors in a similar manner. In addition, some of the factors described above could be omitted.

For a given vendor access, export review management system 114 classifies the information represented by the controlled items 308.

To classify the information in the vendor access, export review management system 114 provides the export team with a choice of information classes for each vendor access through some other GUI mechanism. All vendor access are classified into a consistent set of information classes.

The above factors are data class, functionality, vendor, priority, life-cycle, compliance, and information class. As noted, the factors that management system 114 makes available for selection are controlled and consistent. Each factor that is available for selection has a corresponding score. For example, the life-cycle factors and their scores could be:

Life-cycle #1-less than 7 days: score=1.
Life-cycle #2-8 days to 31 days: score=2.
Life-cycle #3-32 days to one year: score=3.
Life-cycle #4-one year to five years: score=4.
Life-cycle #5-greater than five years: score=5.

For a given vendor access, a programming export policy may include a classification function written in a machine language, such as javascript, that a processing device 140 can understand and execute. For example, such a classification function may add together the scores for all of the vendor access factors to calculate a numerical representation of a classification for the vendor access 309. Different versions of the programming export policy may change the way in which a classification is calculated, and therefore a processing device always verifies an export policy file using a checksum function to help ensure the version of the export policy and the functions contained therein are unaltered, and the functions may not run if it cannot be verified by the checksum function 310. Prior to summing to the numerical representation of a classification, the individual scores may be normalized. For example, the life-cycle scores could be normalized by dividing by 5, so that all life-cycle scores are between zero and one. Prior to summing the numerical representation of a classification, the individual scores may be weighted to emphasize or de-emphasize a given factor. For example, life-cycle scores could be multiplied by 1.5 to increase the importance of the life-cycle factor relative to the other factors, but priority scores could be multiplied by 0.5 to decrease the importance of the priority factor relative to the other factors. Once the individual scores are normalized and weighted, the normalized and weighted individual scores are summed to obtain the numerical representation of a classification for the vendor access.

For the vendor access, a set of key variables is assessed to determine compatibility between the vendor access and the various classes of export 311. In this example the classes of export are: extremely critical, mission critical, business critical, and redaction/reporting, although different classes-of-export could be used. The key variables are:

Access Frequency-what is the amount of access to the data that will be needed during a given time period.
Archival and Deletion-does the data need to be stored for more than a given time period and does the data need to be deleted at a given time in the future.
Control Plan-what type of security measure is necessary to prevent unauthorized transfers of controlled items to persons or entities subject to Export restrictions.
Government License—are there any license requirements for the recipient countries.
Restricted Destinations List-any countries or territories that are currently the subject of restrictions can be found on the Restricted Destinations List.
Connectivity-what type of Input/Output (I/O) is required for data access.
Data Migration-what percent of the data must be ported to other systems.
Policy Enforcement—are there policies regarding the ability to change or delete the data.
Geographic Locations-how many storage sites are required for the data.
Business Impact—is there a significant business impact if the data is lost.

Export review management system 114 selects the class of export for the vendor access based on the key variables and the classification 312. For example, once the variables are selected for the vendor access, export review management system 114 compares the vendor access variables against the class-of-export variables to determine which classes-of-export are suitable for the vendor access. The classification is used to select from among the suitable classes of export. For example, both the extremely critical and mission critical classes-of-export may be suitable for a given vendor access. The extremely critical class-of-export may be used if the vendor access has a classification numerical representation higher than 10 and the mission critical class-of-export may be used if the vendor access has a classification numerical representation of 10 or lower.

For a given vendor access, export review management system 114 selects a zone based on the selected class of export 313. Typically, each class-of-export is pre-assigned to a zone. New zones and classes-of-export may be implemented over time. For the vendor access, a programming export policy may include programmable functions written in a machine language, such as javascript, that a processing device 140 can understand and execute. For example, for the given vendor access, a programmable jump function may suggest a forwarding location that is not a subject of restrictions found on the Restricted Destinations List, and subsequently change a controlled item's location to a different zone 314. Further, an intervention function may redirect a second sender employee to an approved vendor access of controlled items which are approved for a proposed business activity, where the second sender employee has a different nationality than a first existing sender employee associated with the vendor access in the same base country, thereby conferring additional business advantages, such as favorable conditions for receiving employment-based visas by the second sender employee. The redirection may be a suggestion made to senior management that the export team will have no knowledge of. A checksum function verifies the "effective date" or "last revised date" of an export policy file, and the intervention function may not run if the "effective date" or "last revised date" cannot be verified by the checksum function 310. Advantageously, a programming export policy may use a combination of the various functions to authorize vendor access from a recipient location to a controlled item's current location.

The invention claimed is:

1. A method for performing a search on encrypted export controlled items in a document-oriented recordset system within a corporate asset infrastructure, the method comprising:
   executing a jump function included in the plurality of functions to move the plurality of controlled items to a forwarding location that is not a subject of restrictions found on the Restricted Destination List key variable;
   executing a red flag function included in the plurality of functions to obtain final results, wherein the final results comprise a subset of the plurality of controlled items associated with each of the plurality of classes-of-export that match the search criteria, wherein the red flag function comprises functionality to query an attribute for each of the plurality of controlled items to obtain the redacted technical data list wherein each of the plurality of controlled items listed on the redacted technical data list are subject to export restrictions, and discard any of the plurality of controlled items that are in the redacted technical data list to obtain the subset of the plurality of controlled items; and
   executing a management-operated intervention function included in the plurality of functions to determine a redirection of a sender employee to the final results based on nationality of the sender employee, wherein the nationality is determined to confer advantages to the proprietary business strategies, wherein the intervention function does not include an export team for its management.

2. The method of claim 1, wherein the determining of the indexing value for a desired plaintext item of data further comprises:
   calculating the indexing value based on applying the transformation expression to the desired plaintext item of data.

3. The method of claim 1, wherein the indexing structure includes at least a first item of each of a plurality of paired data items, the first item of each of the plurality of paired data items being an indexing data item having a value based on a respective plaintext data item and the transformation expression and a second item of each of the paired data items being the transformation expression corresponding to what may be applied to the respective plaintext data item to obtain the indexing value.

4. The method of claim 1, wherein the indexing structure includes at least a first item of each of a plurality of paired data items, the first item of each of the plurality of paired data items being an indexing data item having a value based on a respective plaintext data item and the transformation expression and a second item of each of the paired data items being a pointer to a data structure comprises the transformation expression corresponding to what may be applied to the respective plaintext data item to obtain the indexing value.

5. The method of claim 1, wherein the indexing structure includes a B-tree.

6. The method of claim 1 further comprising:
   determining, transparently to a vendor, an indexing value for a desired plaintext item of data provided by the vendor, the indexing value being based, at least partially on the desired plaintext item of data, a transformation expression and a redacted technical data list; and
   using the indexing value to access a corresponding entry in an indexing structure to obtain a document-oriented recordset entry including encrypted ciphertext corresponding to the desired plaintext item of data.

7. The method of claim 1 further comprising:
   executing an ECCN function included in the plurality of functions to calculate a numerical representation of an ECCN for the vendor access, wherein the ECCN function calculates the numerical representation based on normalized and weighted scores for all factors associated with the vendor access.

8. The method of claim 1 further comprising:
   executing a search operation to obtain initial results, wherein the initial results comprise a plurality of classes-of-export that match a search criteria and a plurality of controlled items associated with the plurality of classes-of-export that match the search criteria, wherein the search criteria includes the numerical representation and a plurality of key variables, the plurality of key variables include at least one of Access Frequency, Archival and Deletion, Control Plan, Government License, Restricted Destinations List, Connectivity, Data Migration, Policy Enforcement, Geographic Locations, and Business Impact.

9. An encrypted document-oriented recordset system for performing a search on export controlled items within a corporate asset infrastructure, comprising:
   a processing device having a processor;
   an export review management system deployed on the processing device and operable to execute on the processor, the export review management system operate to:
   execute a jump function included in the plurality of functions to move the plurality of controlled items to a forwarding location that is not a subject of restrictions found on the Restricted Destination List key variable;
   execute a red flag function included in the plurality of functions to obtain final results, wherein the final results comprise a subset of the plurality of controlled items associated with each of the plurality of classes-of-export that match the search criteria, wherein the red flag function comprises functionality to query an attribute for each of the plurality of controlled items to obtain the redacted technical data list wherein each of the plurality of controlled items listed on the redacted technical data list are subject to export restrictions, and discard any of the plurality of controlled items that are in the redacted technical data list to obtain the subset of the plurality of controlled items; and
   execute an intervention function included in the plurality of functions to determine a redirection of a sender employee to the final results based on nationality of the sender employee, wherein the nationality is determined to confer advantages to the proprietary business strategies, wherein the intervention function does not include an export team for its management.

10. The system of claim 9, wherein the export review management system operate to further perform:
    executing an ECCN function included in the plurality of functions to calculate a numerical representation of an ECCN for the vendor access, wherein the processor checks a checksum of the programmable export policy to verify that the ECCN function is unaltered based on version information of the programmable export policy, wherein the processor executes the ECCN function to calculate the numerical representation based on normalized and weighted scores for all factors associated with the vendor access.

11. The system of claim 9, wherein the export review management system operate to further perform:

executing a search operation to obtain initial results, wherein the initial results comprise a plurality of classes-of-export that match a search criteria and a plurality of controlled items associated with the plurality of classes-of-export that match the search criteria, wherein the search criteria includes the numerical representation and a plurality of key variables, the plurality of key variables include at least one of Access Frequency, Archival and Deletion, Control Plan, Government License, Restricted Destinations List, Connectivity, Data Migration, Policy Enforcement, Geographic Locations, and Business Impact.

12. The system of claim 9, wherein the export review management system operate to further perform:

determining, transparently to a vendor, an indexing value for a desired plaintext item of data provided by the vendor, the indexing value being based, at least partially on the desired plaintext item of data, a transformation expression and a redacted technical data list; and using the indexing value to access a corresponding entry in an indexing structure to obtain a document-oriented recordset entry including encrypted ciphertext corresponding to the desired plaintext item of data.

13. The system of claim 9, wherein the determining of the indexing value for a desired plaintext item of data further comprises:

calculating the indexing value based on applying the transformation expression to the desired plaintext item of data.

14. The system of claim 9, wherein the indexing structure includes at least a first item of each of a plurality of paired data items, the first item of each of the plurality of paired data items being an indexing data item having a value based on a respective plaintext data item and the transformation expression and a second item of each of the paired data items being the transformation expression corresponding to what may be applied to the respective plaintext data item to obtain the indexing value.

15. The system of claim 9, wherein the indexing structure includes at least a first item of each of a plurality of paired data items, the first item of each of the plurality of paired data items being an indexing data item having a value based on a respective plaintext data item and the transformation expression and a second item of each of the paired data items being a pointer to a data structure comprises the transformation expression corresponding to what may be applied to the respective plaintext data item to obtain the indexing value.

16. The system of claim 9, wherein the indexing structure includes a B-tree.

* * * * *